US010095870B2

(12) United States Patent
Wang (10) Patent No.: US 10,095,870 B2
(45) Date of Patent: Oct. 9, 2018

(54) VIRTUAL MACHINE CREATION METHOD AND APPARATUS (71) Applicant: CLOUDMINDS (SHENZHEN) ROBOTICS SYSTEMS CO., LTD., Beijing (CN)

(72) Inventor: Yonghui Wang, Beijing (CN)

(73) Assignee: CLOUDMINDS (SHENZHEN) ROBOTICS SYSTEMS CO., LTD., Beijing (CN)

(*) Notice: Subject to any disclaimer, the term of this patent is extended or adjusted under 35 U.S.C. 154(b) by 0 days.

(21) Appl. No.: 15/661,168

(22) Filed: Jul. 27, 2017

(65) Prior Publication Data

US 2017/0323105 A1 Nov. 9, 2017

Related U.S. Application Data (63) Continuation of application No. PCT/CN2016/080128, filed on Apr. 25, 2016.

(51) Int. Cl.
G06F 21/00 (2013.01)
G06F 21/57 (2013.01)
G06F 8/61 (2018.01)
G06F 9/455 (2018.01)
G06F 8/71 (2018.01)

(52) U.S. Cl.
CPC .............. G06F 21/577 (2013.01); G06F 8/61 (2013.01); G06F 8/63 (2013.01); G06F 8/71 (2013.01); G06F 9/45558 (2013.01); G06F 2009/4557 (2013.01); G06F 2009/45562 (2013.01); G06F 2009/45587 (2013.01); G06F 2221/033 (2013.01)

(58) Field of Classification Search
CPC ...... G06F 21/577; G06F 8/63; G06F 9/45558; G06F 2221/033; G06F 2009/45587; G06F 2009/4557; G06F 2009/45562
See application file for complete search history.

(56) References Cited

U.S. PATENT DOCUMENTS 7,519,814 B2 * 4/2009 Rochette ................. G06F 8/60
709/214
8,230,415 B1 * 7/2012 Thomas .................. G06F 21/57
717/168

(Continued)

FOREIGN PATENT DOCUMENTS

CN 101655798 A 2/2010
CN 103716347 A 4/2014

(Continued)

OTHER PUBLICATIONS

Written Opinion dated Jan. 25, 2017; PCT/CN2016/080128.

Primary Examiner — David Garcia Cervetti
(74) Attorney, Agent, or Firm — Ladas & Parry LLP (57) ABSTRACT A virtual machine creation method and apparatus are disclosed. The method includes: acquiring a first installation package of a first application; determining essential environmental data corresponding to the first installation package; obtaining a simplified operating system via compilation according to the essential environmental data; packaging the simplified operating system and the first installation package to obtain a virtual machine installation package; and running the virtual machine installation package to create a virtual machine.

6 Claims, 5 Drawing Sheets (56) References Cited

U.S. PATENT DOCUMENTS

| | | | |
|---|---|---|---|
| 8,578,363 B2* | 11/2013 | Sah | G06F 8/65 717/169 |
| 8,694,989 B1* | 4/2014 | Carlson | G06F 9/45537 717/174 |
| 8,862,741 B1* | 10/2014 | Tegtmeier | H04L 41/145 709/220 |
| 8,990,809 B1* | 3/2015 | Jacob | G06F 9/45533 718/1 |
| 9,032,481 B2* | 5/2015 | Ikeda | H04W 12/08 726/10 |
| 9,747,091 B1* | 8/2017 | Berg | G06F 8/61 |
| 9,747,136 B2* | 8/2017 | Sathyamurthy | G06F 9/5077 |
| 2004/0123152 A1* | 6/2004 | Le Saint | G06F 21/52 726/9 |
| 2005/0283622 A1* | 12/2005 | Hall | G06F 21/51 713/190 |
| 2006/0031830 A1* | 2/2006 | Chu | G06F 21/10 717/174 |
| 2009/0044170 A1* | 2/2009 | Bernardi | G06F 8/61 717/105 |
| 2009/0064086 A1* | 3/2009 | Faus | G06F 8/60 717/100 |
| 2009/0228629 A1* | 9/2009 | Gebhart | G06F 8/63 711/6 |
| 2009/0254993 A1* | 10/2009 | Leone | G06F 21/51 726/25 |
| 2009/0271787 A1* | 10/2009 | Clark | G06F 9/445 718/1 |
| 2010/0023934 A1* | 1/2010 | Sheehan | G06F 8/71 717/168 |
| 2010/0138823 A1* | 6/2010 | Thornley | G06F 8/61 717/174 |
| 2011/0035747 A1* | 2/2011 | Machida | G06F 8/63 718/100 |
| 2011/0126197 A1* | 5/2011 | Larsen | H04L 9/3213 718/1 |
| 2011/0265164 A1* | 10/2011 | Lucovsky | G06F 9/45533 726/7 |
| 2011/0271279 A1* | 11/2011 | Pate | G06F 21/53 718/1 |
| 2012/0137281 A1* | 5/2012 | Kleiner | G06F 8/61 717/174 |
| 2012/0137369 A1* | 5/2012 | Shin | G06F 21/57 726/25 |
| 2012/0144391 A1* | 6/2012 | Ueda | G06F 9/45558 718/1 |
| 2012/0246634 A1* | 9/2012 | Wright | G06F 9/44521 717/174 |
| 2012/0331463 A1* | 12/2012 | Orveillon | G06F 8/63 718/1 |
| 2013/0132950 A1* | 5/2013 | McLeod | G06F 8/63 718/1 |
| 2013/0232498 A1* | 9/2013 | Mangtani | G06F 9/5072 718/104 |
| 2013/0275596 A1* | 10/2013 | Subramaniam | H04L 41/04 709/226 |
| 2013/0297922 A1* | 11/2013 | Friedman | G06F 8/63 713/2 |
| 2014/0006580 A1* | 1/2014 | Raghu | G06F 9/5072 709/223 |
| 2014/0040446 A1* | 2/2014 | Cohen | G06F 9/5055 709/223 |
| 2014/0059544 A1* | 2/2014 | Koganty | G06F 9/45533 718/1 |
| 2014/0173594 A1* | 6/2014 | Ng | G06F 9/45533 718/1 |
| 2015/0039875 A1* | 2/2015 | Di Cocco | G06F 9/4416 713/2 |
| 2015/0106810 A1* | 4/2015 | Ciano | G06F 9/45533 718/1 |
| 2015/0120818 A1* | 4/2015 | Kim | G06F 9/45558 709/203 |
| 2015/0269029 A1* | 9/2015 | Smith | G06F 9/4406 714/15 |
| 2016/0096136 A1 | 4/2016 | Su et al. | |
| 2016/0098288 A1* | 4/2016 | Petrov | G06F 9/45558 718/1 |
| 2016/0162338 A1* | 6/2016 | Sathyamurthy | G06F 9/5077 718/1 |
| 2016/0179850 A1* | 6/2016 | Martin | G06F 17/303 707/634 |
| 2016/0378519 A1* | 12/2016 | Gaurav | G06F 9/5077 718/1 |
| 2016/0378530 A1* | 12/2016 | Ramasubramanian | G06F 9/45558 718/1 |
| 2016/0379237 A1* | 12/2016 | Shapsa | G06Q 30/0206 705/7.35 |
| 2016/0380862 A1* | 12/2016 | Shapsa | H04L 43/04 709/224 |
| 2017/0003991 A1* | 1/2017 | Strandzhev | G06F 9/45558 |
| 2017/0075675 A1* | 3/2017 | Babol | G06F 8/64 |
| 2017/0109212 A1* | 4/2017 | Gaurav | G06F 9/45533 |
| 2017/0149880 A1* | 5/2017 | Lochhead | G06F 9/00 |
| 2017/0149931 A1* | 5/2017 | Lochhead | H04L 67/327 |
| 2017/0161023 A1* | 6/2017 | Khazanchi | G06F 8/20 |
| 2017/0161043 A1* | 6/2017 | Khazanchi | H04L 67/10 |
| 2017/0161057 A1* | 6/2017 | Khazanchi | G06F 8/70 |
| 2017/0161101 A1* | 6/2017 | Khazanchi | G06F 9/4843 |
| 2017/0163669 A1* | 6/2017 | Brown | H04L 63/1425 |
| 2017/0168714 A1* | 6/2017 | Saha | G06F 3/0604 |
| 2017/0214737 A1* | 7/2017 | Agarwal | G06F 9/45558 |
| 2017/0214738 A1* | 7/2017 | Agarwal | H04L 67/1002 |
| 2017/0228227 A1* | 8/2017 | Winterfeldt | G06F 8/60 |
| 2017/0228245 A1* | 8/2017 | Hardy | G06F 9/45558 |
| 2017/0242866 A1* | 8/2017 | Imai | G06F 8/62 |
| 2017/0270449 A1* | 9/2017 | Shrimali | G06F 17/11 |
| 2017/0288863 A1* | 10/2017 | Dimitrakos | G06F 21/6209 |
| 2017/0364713 A1* | 12/2017 | Speak | G06F 21/31 |

FOREIGN PATENT DOCUMENTS

| | | |
|---|---|---|
| CN | 103778368 A | 5/2014 |
| CN | 105320546 A | 2/2016 |

* cited by examiner

FIG. 5

VIRTUAL MACHINE CREATION METHOD AND APPARATUS

CROSS-REFERENCE TO RELATED APPLICATIONS

This application is a continuation of International Application No. PCT/CN2016/080128, with an international filing date of Apr. 25, 2016, the entire contents of which are incorporated herein by reference.

TECHNICAL FIELD

The present invention relates to the technical field of virtualization, and in particular, relates to a virtual machine creation method and apparatus.

BACKGROUND

Mobile terminals have become an important tool in users' daily life and work. With dramatic advancements of the mobile Internet by the promotion of mobile terminals, the security issue of the mobile terminals is becoming more and more severe, which is extensively concerned in the society. Mobile virtualization allows a plurality of operating systems or virtual machines (VM) to simultaneously run on a mobile phone or a wireless handheld device, and a secure and independent software running environment is created on the bottom-layer hardware using a Hypervisor. By means of mobile virtualization, a user does not need to carry two or more than two mobile devices, and is capable of accessing a plurality of operating systems in one physical handheld device. Mobile virtualization has prominent features in the aspect of security.

Through isolation achieved by the virtualization technology, a plurality of operating systems are isolated on a single terminal, and thus processes running in the operating systems are prevented from causing adverse impacts to other operating systems. A typical application scenario is to achieve isolation of an enterprise system and a personal system on a mobile device such as a mobile phone by using the virtualization technology, prevent latent risks caused by processes in the personal system to the enterprise system, and accommodate requirements imposed on Bring Your Own Device (BYOD) by some enterprises having security requirement.

Figure 1:
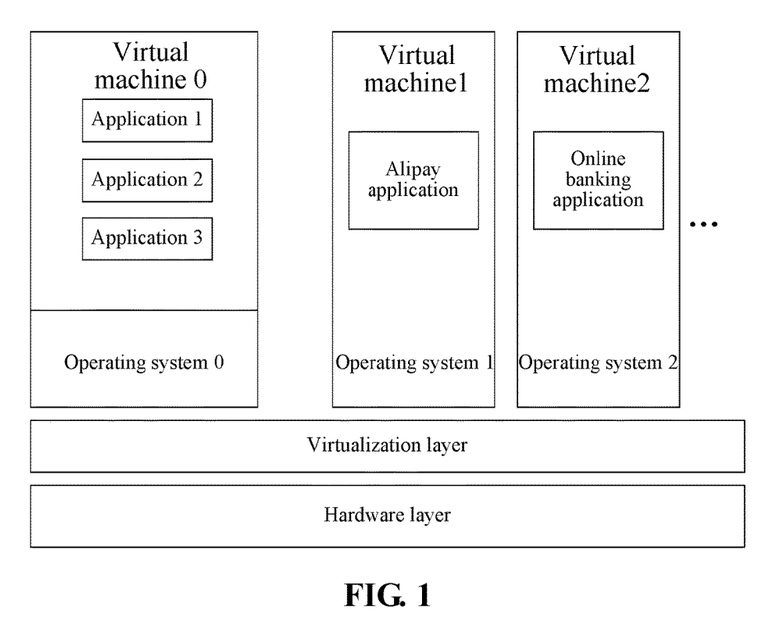
FIG. 1 illustrates a schematic architecture diagram of a virtual machine solution in the prior art.

For further improvement of isolation of various application levels in a terminal, in the architecture of the technical solution as illustrated in FIG. 1, some applications having a low security requirement, for example, applications 1, 2 and 3 do not need to be isolated, and may run on one virtual machine. With respect to some applications having a high security requirement, for example, Alipay, online banking applications or enterprise mailbox applications, the user desires to create an independent virtual machine for each of these applications, and each virtual machine is mounted and run an operating system and is for dedicatedly running an application, so as to achieve better isolation between these applications having a security requirement.

SUMMARY

An embodiment of the present invention provides a virtual machine creation method. The method includes:
acquiring a first installation package of a first application;
determining essential environmental data corresponding to the first installation package;
obtaining a simplified operating system via compilation according to the essential environmental data;
packaging the simplified operating system and the first installation package to obtain a virtual machine installation package; and
running the virtual machine installation package to create a virtual machine.

Another embodiment of the present invention provides a virtual machine creation apparatus. The apparatus includes:
at least one processor; and
a memory communicably connected with the at least one processor and storing one or more programs executable by the at least one processor, the one or more programs including:
a first acquiring module, configured to acquire a first installation package of a first application:
a compiling and packaging module, configured to determine essential environmental data corresponding to the first installation package, obtain a simplified operating system via compilation according to the essential environmental data, and package the simplified operating system and the first installation package to obtain a virtual machine installation package; and
a creating module, configured to run the virtual machine installation package to create a virtual machine.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

To make the technical solutions and advantages of the present invention clearer and more understandable, exemplary embodiments of the present invention are described in detail hereinafter with reference to the accompanying drawings. Apparently, the described embodiments are merely a part of embodiments of the present invention, instead of all the embodiments of the present invention. It should be noted that in cases of no conflict, the embodiments and features in the embodiments of the present invention may be combined together.

The present application includes: acquiring a first installation package of a first application; determining essential environmental data corresponding to the first installation package, obtaining a simplified operating system via compilation according to the essential environmental data; packaging the simplified operating system and the first installation package to obtain a virtual machine installation package; and running the virtual machine installation package to create a virtual machine. The present application provides a method for automatically creating a virtual machine for independently running an application, wherein a simplified operating system needed by the applications running on the virtual machine is only configured for the virtual machine, instead of configuring an entire operating system environment. This greatly saves terminal resources. The method is described hereinafter.

For ease of practice of the present invention, description is given hereinafter with reference to examples.

Figure 2:
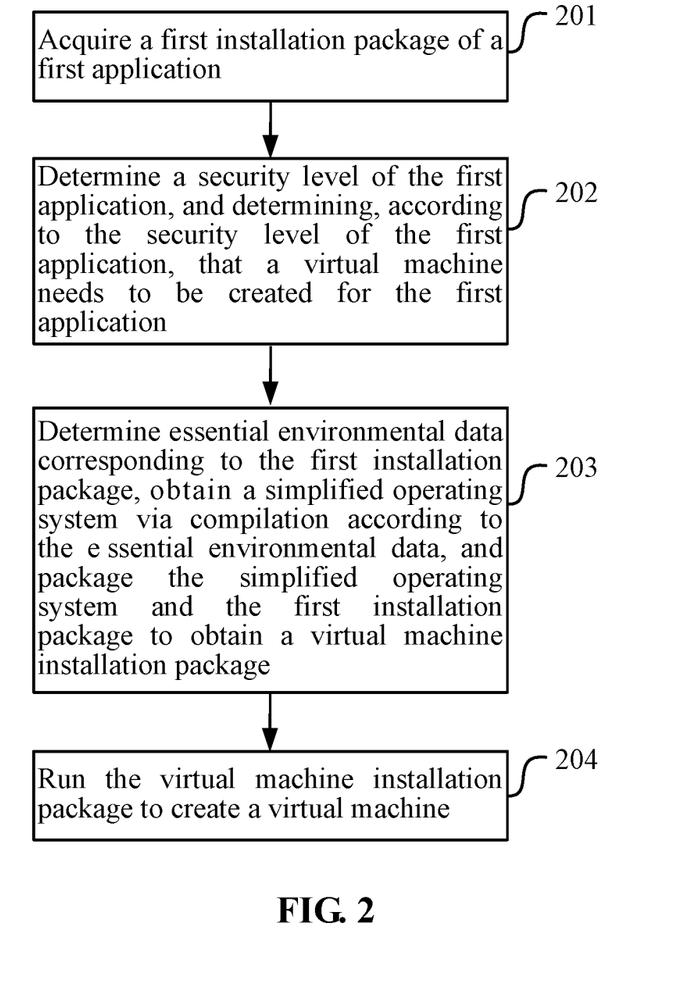
FIG. 2 illustrates a schematic flowchart of a virtual machine creation method according to one embodiment of the present application.

FIG. 2 illustrates a schematic flowchart of a virtual machine creation method according to one embodiment of the present invention. As illustrated in FIG. 2, the virtual machine creation method includes:

Step 201: acquiring a first installation package of a first application;

Step 202: determining a security level of the first application, and determining, according to the security level of the first application, that a virtual machine needs to be created for the first application;

Step 203: determining essential environmental data corresponding to the first installation package, obtaining a simplified operating system via compilation according to the essential environmental data, and packaging the simplified operating system and the first installation package to obtain a virtual machine installation package; and Step 204: running the virtual machine installation package to create a virtual machine.

In step 201, the virtual machine creation method according to this embodiment is applied to create, for a first application, a virtual machine for dedicatedly running the application, wherein the acquiring a first installation package of a first application may include: acquiring a request for installing the first application by a user, determining an installation package of the first application according to the application installation request, and acquiring the installation package.

In step 202, before a virtual machine for dedicatedly running a first application is created for the first application, whether to create, for the first application, a virtual machine for dedicatedly running the application is determined, because various applications imposes a different requirement on isolation. With respect to some applications imposing a higher requirement on security, for example, applications related to online payment, including group-shopping application clients, car-hailing applications clients and the like, or some other applications imposing a much more higher requirement on security and related to direct and large-amount transactions from users' bankcards, including Alipay or online banking clients and the like, a virtual machine for dedicatedly running an application needs to be created. With respect to applications imposing no requirement on security, such as music or video playing applications, news resources browser application clients or dictionary and translation applications or the like, the applications may be installed in a virtual machine to maximally save terminal resources.

Step 202 is an optional step. With this step, a virtual machine may be created for an application whose security requirement satisfies a predetermined condition, and with respect to applications imposing a low security requirement, the applications may be uniformly installed in an operating system of a conventional virtual machine according to the prior art, and no virtual machines are created for the applications. In this way, the terminal resources are further saved on the prerequisite of satisfying the security requirement of the application.

In step 203, the installation package of the first application is unpackaged and scanned to determine the type of the operating system that the application running on (for example, Apple iOS operating system or Android operating system or the like), and determine essential environmental data to be called for running the first application in the operating system. The environmental data includes libraries and relevant files and the like in the operating system, wherein such relevant formation as user authority and the like is included. After the essential environmental data is provided, the need for the running environment during running of the first application is satisfied, and the essential environmental data does not include some environmental data that is not needed during the running of the first application.

In combination with the above environmental data and start and control information of the operating system corresponding to the first application, a new configuration file for compiling the operating system is generated. The start and control information of the operating system is used for starting the environment of the operating system and running the first application in a corresponding operating environment. A simplified "operating system" is compiled according to the generated new configuration file, wherein this simplified "operating system" only includes an operating system environment satisfying running of the first application. The compiled simplified operating system and the first application are packaged to generate a virtual machine installation package Image (an image file).

Although when running in various operating systems, almost all the applications need support of their corresponding "start and control information of the operating systems", the environmental data which different applications need to call, that is, "libraries and relevant files", is greatly different, and is generally less than all the environmental data of a complete operating system. For example, a complete operating system may occupy several GBs of a memory, whereas a simplified operating system for various applications only occupies tens or several hundreds of MBs of a memory. Therefore, the virtual machine created according to this technical solution not only satisfies the running requirements of various applications, but also greatly reduces consumption of the memory.

In step 204, after a virtualization layer host (Host) runs the image file of the virtual machine installation package, a virtual machine for dedicatedly running the first application may be directly created, that is, a virtual machine is created, and the simplified operating system is configured on the created virtual machine and the first application is installed.

Figure 3:
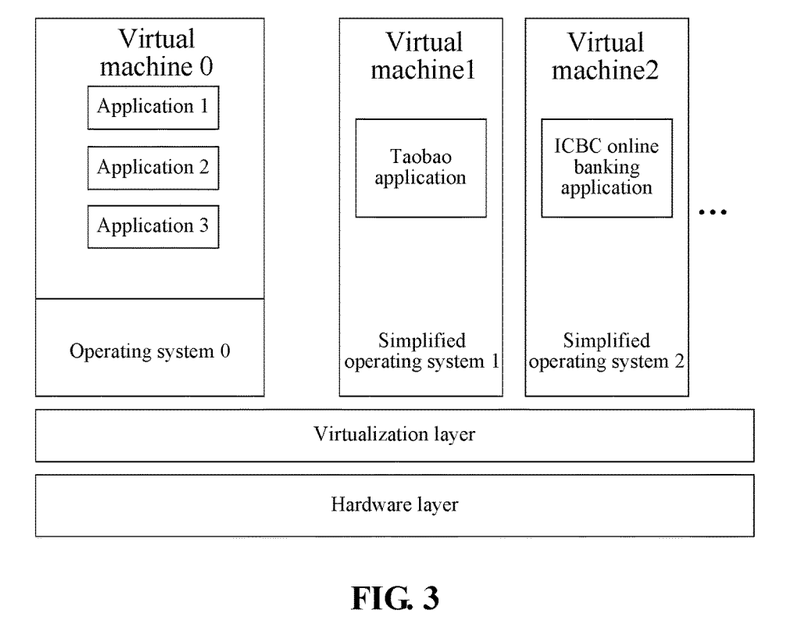
FIG. 3 illustrates a schematic architecture diagram of a virtual machine solution according to one embodiment of the present application.

The architecture upon creation of a virtual machine according to the present application is as illustrated in FIG. 3. The Taobao client application and the online banking application which impose a high security requirement are independently installed on a virtual machine for dedicatedly running these two applications. In addition, consumption and occupation of terminal resources by the virtual machine for dedicatedly running these applications is maximally reduced.

The present application provides a method for automatically creating a virtual machine for independently running an application, wherein a simplified operating system needed by the applications running on the virtual machine is only configured for the virtual machine, instead of configuring an entire operating system environment. This greatly saves terminal resources.

Figure 4:
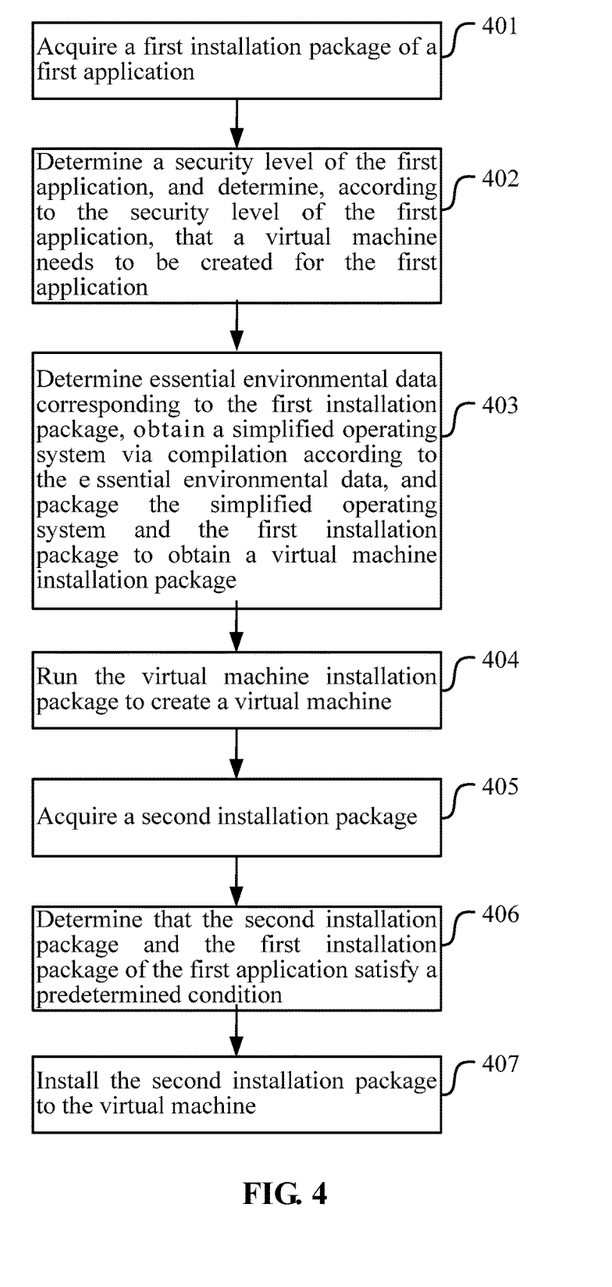
FIG. 4 illustrates a schematic flowchart of a virtual machine creation method according to another embodiment of the present application.

FIG. 4 illustrates a schematic flowchart of a virtual machine creation method according to another embodiment of the present invention. For parts in this embodiment that are similar or duplicate to those in the aforesaid embodiment, reference may be made to the description of the aforesaid embodiment. As illustrated in FIG. 4, the method includes:

Step 401: acquiring a first installation package of a first application;

Step 402: determining a security level of the first application, and determining, according to the security level of the first application, that a virtual machine needs to be created for the first application;

Step 403: determining essential environmental data corresponding to the first installation package, obtaining a simplified operating system via compilation according to the essential environmental data, and packaging the simplified operating system and the first installation package to obtain a virtual machine installation package;

Step 404: running the virtual machine installation package to create a virtual machine;

Step 405: acquiring a second installation package;

Step 406: determining that the second installation package and the first installation package of the first application satisfy a predetermined condition; and Step 407: installing the second installation package to the virtual machine.

Steps 401 to 404 in this embodiment are the same as steps 201 to 204 in the aforesaid embodiment, and these steps may be referenced to the above related description.

According to this embodiment, after a virtual machine for dedicatedly running an application is created, in step 405, a second installation package is acquired, and an attempt is made to install the second installation package on the created virtual machine.

In step 406, under general circumstances, the second installation package will be installed to an existing virtual machine running a plurality of applications imposing a low security requirement, or according to steps 201 to 204 or steps 401 to 404, a new virtual machine is created for the second installation package and the second installation package is installed on the new virtual machine. If a new virtual machine is created for any new installation package, the number of virtual machines in the system is large, and thus terminal resources may be wasted. In step 406, whether the second installation package satisfies a predetermined condition is determined, and the second installation package satisfying the predetermined condition may be installed on an existing virtual machine for dedicatedly running an application, to reduce the number of virtual machines appropriately.

In some embodiments, the predetermined condition may be: the second installation package is an updated installation package of the first application.

An updated application still imposes the same security requirement, runs the same operating system, and basically needs the same environmental data or needs little additional data. Therefore, when a virtual machine for dedicatedly running an application has been created for this application, and an updated installation package of the application has also been obtained, there is no need to create a independent virtual machine for the updated installation package, but the updated installation package needs to be installed on a virtual machine of the application corresponding to the updated installation package, so as to prevent creating a new virtual machine for the updated installation package and consuming terminal resources.

In some embodiments, the predetermined condition may be: the second installation package is an installation package of a second application, and a security level of the second application is the same as the security level of the first application.

Some similar applications impose the same security requirement. For such similar applications, it is more important to isolate these applications from ordinary applications, instead of isolating these applications from each other. Therefore, it may be considered to install the applications having the same security level on a newly created virtual machine. Using the architecture illustrated in FIG. 3 as an example, where a independent virtual machine has been created for Taobao client application and the online banking application in the conventional virtualization architecture, if a user desires to install Tmall client application (Tmall client application and Taobao client application are two e-commerce applications having similar functions developed by Alibaba, which both relates to user account and payment information and may be considered to have the same security level), it is determined that the installation package of the Tmall client application satisfies the predetermined condition after it is determined that the Tmall client application and the existing Taobao client application have the same security level, and the Tmall client application is installed on a virtual machine for dedicatedly running Taobao client application, so as to prevent creation of a large number of virtual machines and consumption of terminal resources.

In some embodiments, when the second installation package is an installation package of the second application, the predetermined condition may include: determining that a similarity between essential environmental data corresponding to the second installation package and the essential environmental data corresponding to the first installation package exceeds a predetermined threshold.

Considering that it needs to be further considered whether the environmental data to be called by applications is the same or similar when these applications having the same security level are installed on a virtual machine, when the environmental data needed by various applications is greatly different, the virtual machine capable of simultaneously running these applications will contain a large amount of environmental data, which is equivalent to installation of a complete operating system. As such, in one aspect, applications having the same security level may not be better isolated, and in another aspect, the memory occupied by the virtual machine may not be minimized.

Therefore, the second installation package is installed on the virtual machine for dedicatedly running the first application only when the similarity between the essential environmental data corresponding to the second installation package and the essential environmental data corresponding to the first installation package of the first application exceeds a predetermined threshold. That the similarity of the environmental data exceeds the predetermined threshold include: the essential environmental data corresponding to the second installation package is less than the essential environmental data corresponding to the first installation package of the first application, or the essential environmental data corresponding to the second installation package is the same as the essential environmental data corresponding to the first installation package of the first application, or the ratio of the size of memory occupied by the same portion of the environmental data corresponding to the second installation package and the essential environmental data corresponding to the first installation package of the first application to the total size of the memory occupied by the essential environmental data corresponding to the second installation package exceeds a predetermined ratio (for example, 90%).

That is, if the environmental data needed by two applications is greatly different, even if these two applications have the same security level, a later application may not be installed on the virtual machine for dedicatedly running a previous application.

For example, the environmental data needed by Tmall client application is the same as the environmental data essential by Taobao client application. Therefore, TinaII client application may be installed, using the installation package of Tmall client application, on the virtual machine for dedicatedly running Taobao client application. The environmental data needed by Xianyu client application (Xianyu client application is similar to Taobao client application and Tmall client application, which is an e-commerce application having similar functions developed by Alibaba and also relates to user account and payment information, and may thus considered to have the same security level as Taobao client application and Tmall client application) is less than the environmental data needed by Taobao client application. Therefore, Xianyu client application may be installed on the existing virtual machine for dedicatedly running Taobao client application. Finally, the virtual machine originally for dedicatedly running Taobao client application may run Taobao client application, Tmall client application and Xianyu client application, and other applications satisfying the above condition may be further installed on the virtual machine.

In step 407, the second installation package satisfying the predetermined condition is installed on the virtual machine.

When the second installation package is an updated installation package of the first application, a new function may need to be added during the updating and upgrading process of the application. Therefore, the updated installation package is scanned, the environmental data essential by the updated installation package is compared with the environmental data supported by the existing virtual machine for dedicatedly running the first application to determine environmental data to be called for newly adding or modifying a function, and the determined environmental data and the start and control information of the operating system upon update of the first application are re-compiled, and installed together with the second installation package to the existing virtual machine for dedicatedly running the first application in the form of an extended application. The virtual machine needs to update a list of the supported environmental data, and update the start and control information of the operating system of the first application.

For example, if Taobao client application previously installed by the user does not have the function of scanning codes to find commodities, and Taobao client application in a latest version is capable of calling the camera to acquire, via scanning, a two-dimensional code and barcode information of a commodity, environmental data needed for calling the camera in the operating system needs to be added on the virtual machine originally for dedicatedly running Taobao client application, and start and control information of the operating system corresponding to Taobao client application in the latest version needs to be updated.

When the second installation package is an installation package of the second application, if the essential environmental data corresponding to the second installation package is less than the essential environmental data corresponding to the first installation package of the first application, or the essential environmental data corresponding to the second installation package is the same as the essential environmental data corresponding to the first installation package of the first application, there is no need to add new environmental data, the second application is directly installed on the existing virtual machine for dedicatedly running the first application, and the start and control information of the operating system corresponding to the second application is meanwhile added to the virtual machine.

For example, if a user has created a virtual machine for dedicatedly running Taobao client application, and desires to install Tmall client application, the Host judges that the security level of Tmall client application is the same as the security level of Taobao client application, the two applications run in the same operating system (for example, the Android operating system), and meanwhile the environmental data in the operating system to be called by these two applications are exactly the same. In this case, Tmall client application is directly installed on the virtual machine for dedicatedly running Taobao client application, and start and control information of the operating system corresponding to Tmall client application is added to the virtual machine.

If the ratio of the size of memory occupied by the same portion of the environmental data corresponding to the second installation package and the essential environmental data corresponding to the first installation package of the first application to the total size of the memory occupied by the essential environmental data corresponding to the second installation package exceeds a predetermined ratio (for example, 90%), that is, a portion of the environmental data needed by the second application may be different from the environmental data essential by the first application, when the second application is installed on the virtual machine for dedicatedly running the first application, environmental data, needed by the second application, different from that needed by the first application may also be added in addition to the start and control information of the operating system corresponding to the second application.

For example, a user has created a virtual machine for dedicatedly running housing transaction applications, and these applications are similar to e-commerce shopping applications but do not relate to the actual payment function. Therefore, the environmental data in the related operating system may be slightly less than that essential by Taobao client application or Tmall client application. In this case, the user initiates a request for installing Taobao client application, and the Host judges that the security level of Taobao client application is the same as the security level of the housing transaction application running on an independent virtual machine. In addition, although the environmental data essential by Taobao client application is slightly more than the environmental data essential by the housing transaction application, the similarity of their essential environmental data exceeds a predetermined threshold (for example, 90% of their environmental data is the same). As such, while installing Taobao client application on the virtual machine, the Host supplements the environmental data to be additionally called by Taobao client application and different from the environmental data essential by the housing transaction application, and start and control information of the operating system of Taobao client application.

Upon successful installation of Taobao client application, a list of the environmental data of the virtual machine is updated.

The present application provides a method for automatically creating a virtual machine for independently running an application, wherein a simplified operating system needed by the applications on the virtual machine is only configured for the virtual machine, instead of configuring an entire operating system environment. This greatly saves terminal resources. In addition, where a virtual machine for dedicatedly running an application is created, an updated installation package of the application or other applications may be further installed on the virtual machine according to the actual needs, so as to achieve optimal utilization of terminal resources.

Figure 5:
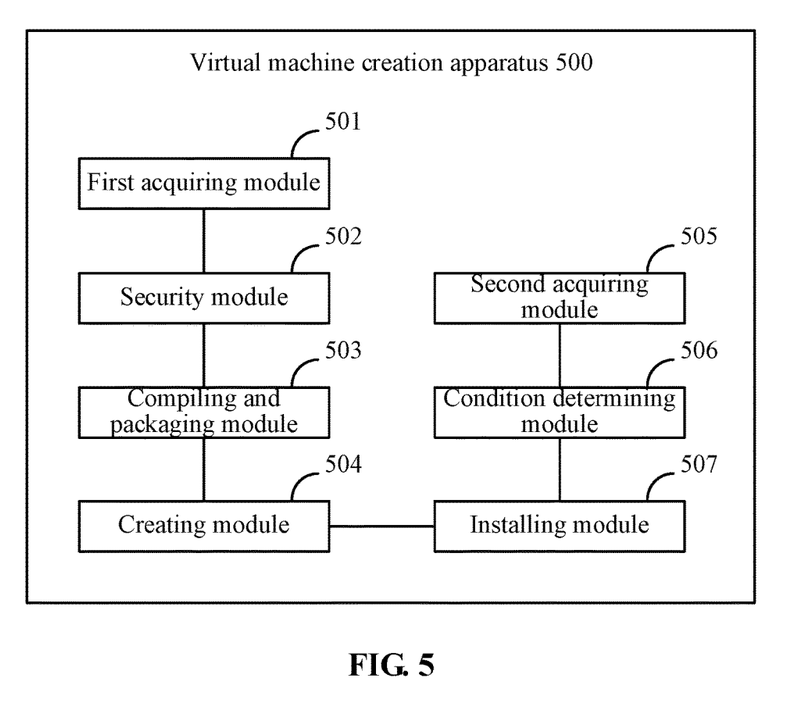
FIG. 5 illustrates a schematic structural diagram of a virtual machine creation apparatus according to another embodiment of the present application.

Based on the same inventive concept, another embodiment of the present invention provides a virtual machine creation apparatus. Since the principle based on which the apparatus solves the technical problem is similar to the principle used by the virtual machine creation method, practice of the apparatus may be referenced to practice of the method. The duplicate portions are not described herein any further. FIG. 5 illustrates a schematic structural diagram of a virtual machine creation apparatus according to the embodiment of the present invention. As illustrated in FIG. 5, the virtual machine creation apparatus 500 includes:

- a first acquiring module 501, configured to acquire a first installation package of a first application;
- a compiling and packaging module 503, configured to determine essential environmental data corresponding to the first installation package, obtain a simplified operating system via compilation according to the essential environmental data, and package the simplified operating system and the first installation package to obtain a virtual machine installation package; and
- a creating module 504, configured to run the virtual machine installation package to create a virtual machine.

In some embodiments, the apparatus 500 further includes a security module 502, wherein before the compiling and packaging module 503 determines the essential environmental data corresponding to the first installation package, the security module 502 is configured to determine a security level of the first application, and determine, according to the security level of the first application, that a virtual machine needs to be created for the first application.

In some embodiments, the apparatus 500 further includes:
- a second acquiring module 505, configured to acquire a second installation package after the creating module 504 runs the virtual machine installation package to create a virtual machine;
- a condition determining module 506, configured to determine that the second installation package and the first installation package of the first application satisfy a predetermined condition; and
- an installing module 507, configured to install the second installation package to the virtual machine after the condition determining module 506 determines that second installation package and the first installation package of the first application satisfy the predetermined condition.

In some embodiments, the predetermined condition includes: the second installation package is an updated installation package of the first application.

In some embodiments, the predetermined condition includes: the second installation package is an installation package of a second application, and a security level of the second application is the same as the security level of the first application.

In some embodiments, the condition determining module 506 is further configured to determine that a similarity between essential environmental data corresponding to the second installation package and the essential environmental data corresponding to the first installation package exceeds a predetermined threshold before the installing module installs the second installation package to the virtual machine.

For ease of description, in the description, various parts of the above apparatuses are divided into various modules according to function for independent description. Nevertheless, the function of each module or unit is implemented in the same or a plurality of software and/or hardware when the present invention is practiced.

Those skilled in the art shall understand that the embodiments may be described as illustrating methods, systems, or computer program products. Therefore, hardware embodiments, software embodiments, or hardware-plus-software embodiments may be used to illustrate the present invention. In addition, the present invention may further employ a computer program product which may be implemented by at least one non-transitory computer-readable storage medium with an executable program code stored thereon. The non-transitory computer-readable storage medium includes, but not limited to, a disk memory, a CD-ROM, and an optical memory.

The present invention is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored in a non-transitory computer-readable memory capable of causing a computer or other programmable data processing devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments of the present invention are described, those skilled in the art may make modifications and variations to these embodiments based on the basic inventive concept of the present invention. Therefore, the preferred embodiments and all such modifications and variations shall fall within the protection scope subject to the appended claims.

What is claimed is:

1. A virtual machine creation method, being characterized in that, the method comprising:
    acquiring a first installation package of a first application;
    determining a security level of the first application;
    determining, according to the security level of the first application, that a virtual machine needs to be created for the first application;
    determining essential environmental data corresponding to the first installation package,
    obtaining a simplified operating system via compilation according to the essential environmental data;
    packaging the simplified operating system and the first installation package to obtain a virtual machine installation package;
    running the virtual machine installation package to create a virtual machine;
    acquiring a second installation package;
    determining that the second installation package and the first installation package of the first application satisfy a predetermined condition; and
    installing the second installation package to the virtual machine;
    wherein the predetermined condition comprises: the second installation package is an installation package of a second application, and a security level of the second application is the same as the security level of the first application.

2. The method according to claim 1, being characterized in that, the predetermined condition comprises:
    the second installation package is an updated installation package of the first application.

3. The method according to claim 1, being characterized in that, prior to the installing the second installation package to the virtual machine, the method further comprises:
    determining that a similarity between essential environmental data corresponding to the second installation package and the essential environmental data corresponding to the first installation package exceeds a predetermined threshold.

4. A virtual machine creation apparatus, being characterized in that, the apparatus comprising:
    a first acquiring module, configured to acquire a first installation package of a first application;
    a security module, configured to determine a security level of the first application, and determine, according to the security level of the first application, that a virtual machine needs to be created for the first application;
    a compiling and packaging module, configured to determine essential environmental data corresponding to the first installation package, obtain a simplified operating system via compilation according to the essential environmental data, and package the simplified operating system and the first installation package to obtain a virtual machine installation package;
    a creating module, configured to run the virtual machine installation package to create a virtual machine;
    a second acquiring module, configured to acquire a second installation package after the creating module runs the virtual machine installation package to create a virtual machine;
    a condition determining module, configured to determine that the second installation package and the first installation package of the first application satisfy a predetermined condition; and
    an installing module, configured to install the second installation package to the virtual machine after the condition determining module determines that second installation package and the first installation package of the first application satisfy the predetermined condition;
    wherein the predetermined condition comprises:
    the second installation package is an installation package of a second application, and a security level of the second application is the same as the security level of the first application.

5. The apparatus according to claim 4, being characterized in that, the predetermined condition comprises:
    the second installation package is an updated installation package of the first application.

6. The apparatus according to claim 4, being characterized in that,
    the condition determining module is further configured to determine that a similarity between essential environmental data corresponding to the second installation package and the essential environmental data corresponding to the first installation package exceeds a predetermined threshold before the installing module installs the second installation package to the virtual machine.

* * * * *